Figure 1:
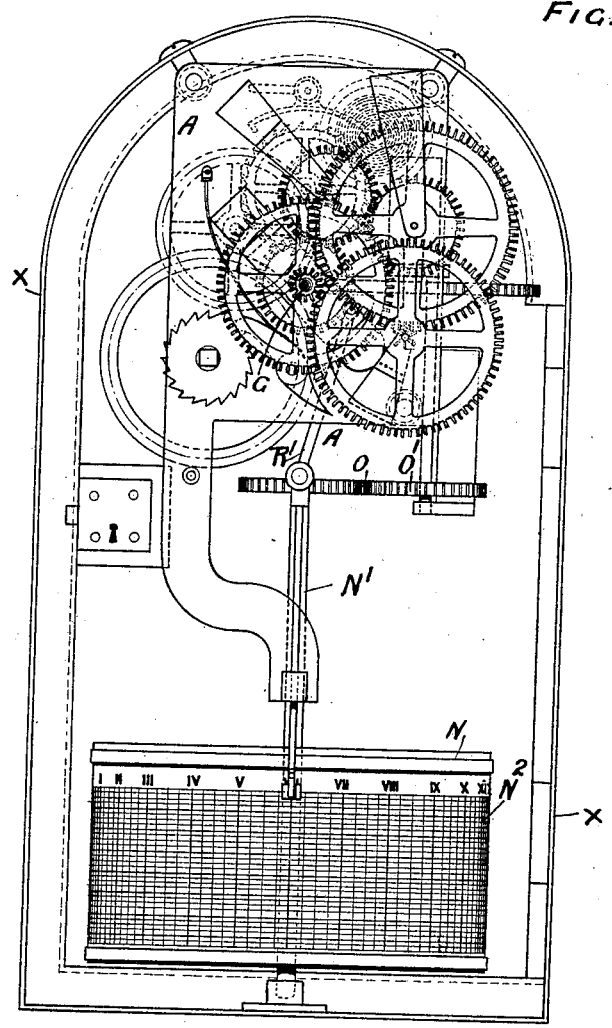

No. 644,202. Patented Feb. 27, 1900.
G. R. HISLOP.
SPEED INDICATOR AND RECORDER.
(Application filed Aug. 19, 1898.)

(No Model.) 4 Sheets—Sheet 1.

Witnesses:
C. Holloway
W. C. Pinckney

Inventor:
George Robertson Hislop,
By J. W. Bower
Attorney

No. 644,202. Patented Feb. 27, 1900.
G. R. HISLOP.
SPEED INDICATOR AND RECORDER.
(Application filed Aug. 19, 1898.)
(No Model.) 4 Sheets—Sheet 2.
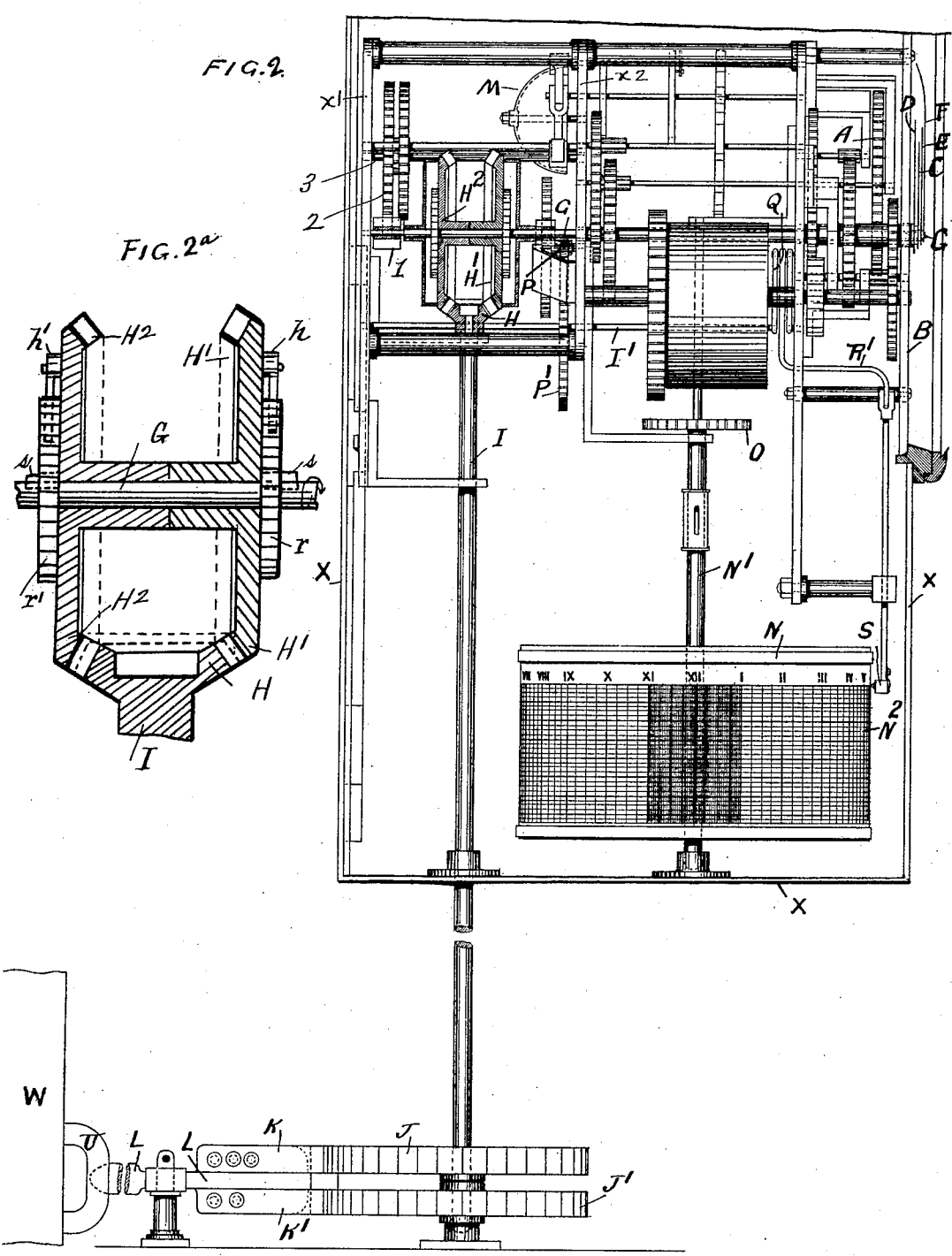

No. 644,202. Patented Feb. 27, 1900.
G. R. HISLOP.
SPEED INDICATOR AND RECORDER.
(Application filed Aug. 19, 1898.)
(No Model.) 4 Sheets—Sheet 3.
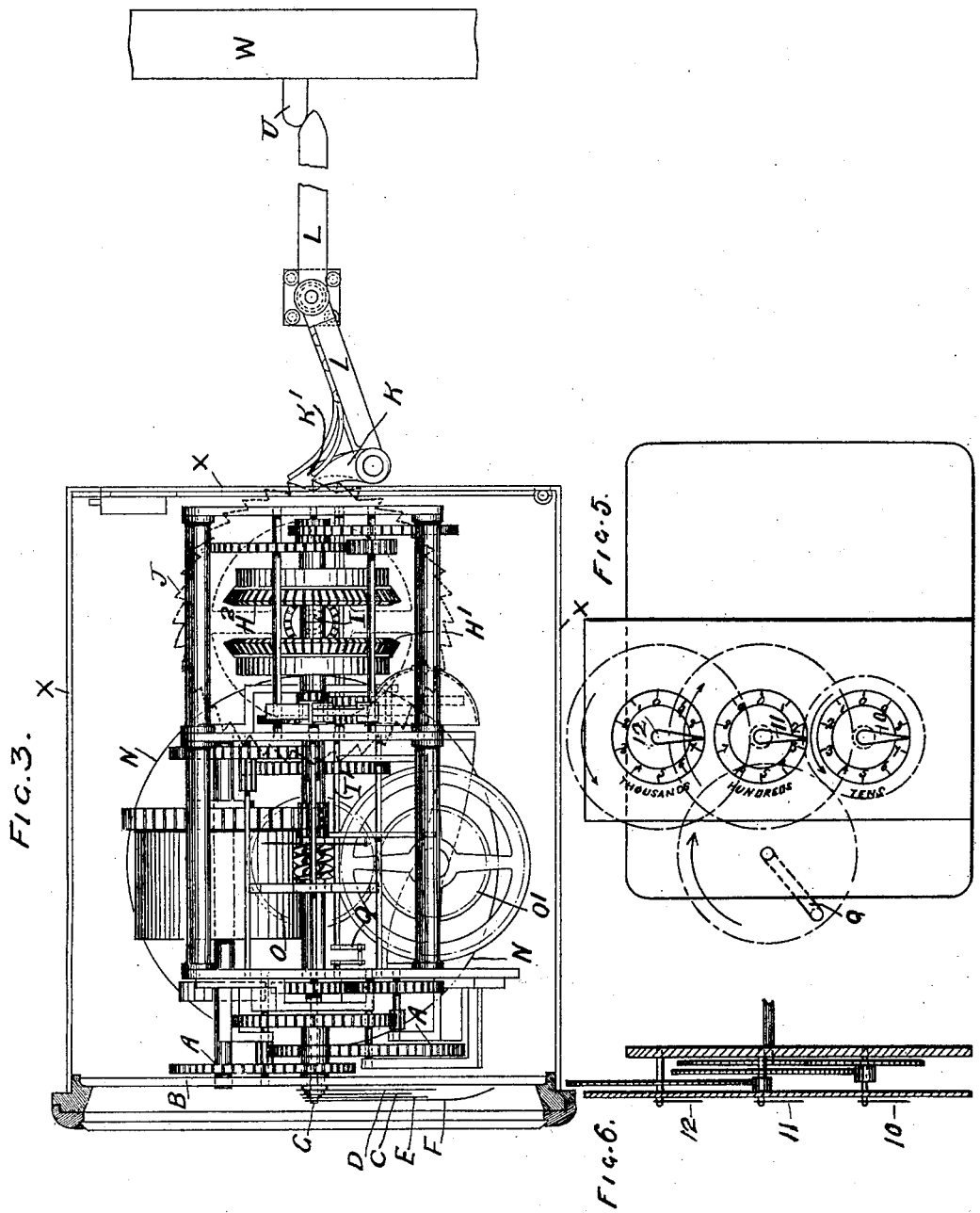

No. 644,202. Patented Feb. 27, 1900.
G. R. HISLOP.
SPEED INDICATOR AND RECORDER.
(Application filed Aug. 19, 1898.)
(No Model.) 4 Sheets—Sheet 4.
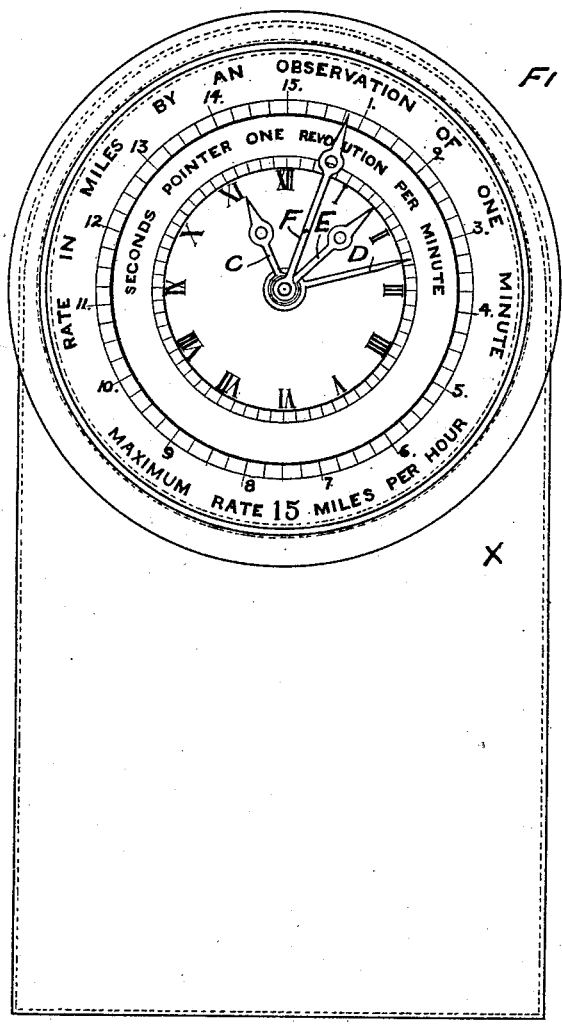

UNITED STATES PATENT OFFICE.

GEORGE ROBERTSON HISLOP, OF PAISLEY, SCOTLAND.

SPEED INDICATOR AND RECORDER.

SPECIFICATION forming part of Letters Patent No. 644,202, dated February 27, 1900.

Application filed August 19, 1898. Serial No. 689,045. (No model.)

*To all whom it may concern:*

Be it known that I, GEORGE ROBERTSON HISLOP, a citizen of the United Kingdom of Great Britain and Ireland, and a resident of the Gas Works, Paisley, county of Renfrew, Scotland, have invented new and useful Improvements in Speed Indicators and Recorders, (which have been patented in Great Britain by Letters Patent dated the 23d day of February, 1898, No. 4,500,) of which the following is a specification.

This invention relates to apparatus for indicating and recording the speed of motor-cars or other road-vehicles and railway or tramway locomotives and cars; and it has for its object to provide a device of that class which will indicate to the driver or passenger during any minute or other short period of time the rate of speed at which the vehicle travels and which may also record the speed at all times throughout any journey or number of journeys, so as to show whether the maximum speed allowed has been exceeded.

In the accompanying drawings, Figures 1 and 2 are sectional elevations at right angles to each other of the improved speed indicating and recording apparatus. Fig. 2ª is an enlarged partial section showing the bevel-gears and connections. Fig. 3 is a sectional plan of the same, and Fig. 4 is a front or face view of the case containing the apparatus. Figs. 5 and 6 are respectively elevation and plan views of a recording device hereinafter referred to.

The improved apparatus comprises clockwork mechanism A and a dial B, resembling that of an ordinary clock, the usual hour and minute hands C D being provided, as also a center seconds-hand E—*i. e.*, a hand which completes a revolution around the dial in sixty seconds—and, finally, a speed-indicating hand or pointer F. The hour, minute, and seconds hands are actuated by the clockwork A in the usual way; but the speed-indicating hand F is driven through gearing, as hereinafter described, from one of the running-wheels W of the vehicle, the said hand F being fitted upon a central arbor or spindle G, carried through the clockwork-spindles and driven by means of bevel-gearing H H' H² from a vertical or other shaft I, having keyed on it two ratchet-wheels J J', operated by spring-pawls K K', carried by a lever-arm L, which is struck and moved by a projection $u$ on the vehicle-wheel W at each revolution of the latter, or is otherwise operated by a moving part of the vehicle. By preference the pawl-lever is fitted with two pawls K K', arranged to act in opposite directions on separate ratchet-wheels J J', so that the first motion-shaft I of the apparatus may be driven in either direction, according as the vehicle is driven forward or backward. Movement always in the same direction is communicated to the arbor G, carrying the indicating hand or pointer F, by gearing said arbor G from the first motion-shaft I through two bevel-wheels H' H² on the former meshing with a bevel-pinion H on the latter, the bevels H' H² being fitted each to turn loosely in one direction, but to engage with the bevel H and turn the arbor G when moved in the opposite direction, the connection being effected, for example, by pawls $h\ h'$, pivoted, respectively, to wheels H' H² and extending in the same direction over the like ratchets $r\ r'$, which are splined by splines $s$ or otherwise rigidly connected to arbor G. When shaft I is turned in one direction by the moving vehicle, pawl $h$ operatively engages its ratchet $r$ to turn arbor G in the desired direction, pawl $h'$ at the same time sliding idly over its ratchet, since pawl $h'$ is carried oppositely to pawl $h$ by wheel H². When the direction of rotation of shaft I is reversed by reversal of the movement of the vehicle, wheel H² is turned in the same direction by shaft I as wheel H' was previously turned, and pawl $h'$ operates on its ratchet to turn arbor G in the same direction, while pawl $h$ slides idly over its ratchet.

In addition to the ordinary hour and minute divisions on the dial-face, as shown at Fig. 4, the dial B is graduated to represent miles, the circle being divided, for example, to show fifteen miles. Assuming that the speed of the vehicles at any time is at the rate of ten miles an hour, the indicating-hand should pass over ten of the mile divisions on the dial while the seconds-hand completes a revolution, the gearing which actuates the indicating-hand being proportioned to produce that result. In this way the driver or passenger by an observation extending over only a single minute or even part of a minute may ascertain the speed of the vehicle in miles per hour.

The center seconds-hand may be brought to zero in the ordinary way for the purpose of facilitating the reading of the speed-indicator at any time.

A bell M may be made to ring on the completion of each mile run as an additional check for the passengers. This bell is intended to ring for every mile traveled. One mile is covered in four minutes. Therefore the bell will ring fifteen times per hour when the motor is at maximum speed. On the left side of the beveled wheel H' and on the same spindle G a pinion-wheel 1, having fifteen teeth, gears into a larger wheel 2, having thirty teeth fixed on and near one end of a separate spindle 3, pivoted in plates $x'$ $x^2$, causing spindle 3 to make one-half revolution per minute. Fixed to this wheel on the same spindle is a spur-wheel having twenty-two teeth and making one revolution per minute, gearing with another larger wheel having forty-four teeth, causing it to make one-fourth revolution per minute, one revolution in four minutes, and fixed to a separate spindle at one end, while at the other is the arrangement for lifting the hammer of bell $m$.

In order to obtain a permanent record of the distance traversed and the rate of speed at all times throughout a journey or several journeys of the vehicle, a cylinder or disk N on a spindle N', rotated by the clockwork through gearing O O', is provided and placed within the clock-casing X. Upon this cylinder N a suitable diagram-card $N^2$ is placed, whereon the twenty-four hours of the day or other periods are represented by vertical lines, as shown by Fig. 2, (or by lines drawn from near the center to the periphery of a disk,) and the miles per hour which the vehicle is allowed to travel by horizontal or radial lines, as the case may be; and from the spindle G, passing to the dial of the timepiece, toothed wheels P P' on that spindle and a countershaft I' are arranged to reduce the speed from one revolution per minute to one revolution per hour. Upon the spindle I' giving this reduced speed a crank Q (see Fig. 3) is provided, to which an arm R' is attached, and upon the lower end of said arm an inking pen, pencil, or style S is fitted to trace the distance traveled across the mile or quarter-mile lines on the indicator-diagram $N^2$ during each revolution of the crank or eccentric Q. Thus not only will the distance traveled every twenty-four hours be recorded, but every stoppage and its duration in minutes or hours, and equally so whether the motion is backward or forward.

In addition to the indicating mechanism described an index may be added for reading the miles traveled per day, month, or year, the pointers 10 11 12 being geared together to indicate tens, hundreds, and thousands, and driven by crank Q, as shown in Figs. 5 and 6.

The speed-indicating mechanism and clockwork are inclosed within a suitable casing X, provided with locking-doors for official control and for necessary access to the diagrammatic registering part of the apparatus, and the apparatus is placed upon any part of the vehicle that may be most suitable for communicating the movements of the vehicle to the indicating and registering devices.

Having now described the invention, what I claim, and desire to secure by Letters Patent, is—

1. The combination in a speed-indicating mechanism for vehicles, with a clock having a graduated dial, and hands, one hand being a seconds-hand moving around the dial in one minute, of a face concentric with the clock-dial graduated to indicate miles per hour, a hand movable thereover, a shaft G carrying said hand, gear H', $H^2$, adapted to act in the same direction on shaft G, wheel H gearing with both wheels H', $H^2$, and shaft I carrying wheel H the shaft being driven by a wheel of the vehicle always in the same direction whichever direction the vehicle moves, the parts being proportioned to move hand F to the number indicating the speed of the vehicle in the time in which the seconds-hand makes one revolution.

2. The combination in a speed-indicating mechanism for vehicles, with a clock having a graduated dial, and hands, one hand being a seconds-hand moving around the dial in one minute, of a face concentric with the clock-dial graduated to indicate miles per hour, a hand movable thereover, a shaft G carrying said hand, gear H', $H^2$, adapted to act in the same direction on shaft G, wheel H gearing with both wheels H', $H^2$, and shaft I carrying wheel H the shaft being driven by a wheel of the vehicle always in the same direction whichever direction the vehicle moves, the parts being proportioned to move hand F to the number indicating the speed of the vehicle in the time in which the seconds-hand makes one revolution, and a recorder having a body N driven by said clock one revolution in twenty-four hours, a diagram-card graduated in two directions the graduations in one direction indicating the twenty-four hours of the day and those in the other direction indicating miles per hour, a shaft I' including crank Q driven by the clock one revolution per hour, an arm moved by the crank, and a pencil moved thereby on the recorder-surface, as set forth.

3. In apparatus for indicating speed of vehicles the combination of a clock having suitable hour, minute and seconds hands, a speed-dial graduated to indicate speed in miles per hour or other given time, an indicating-hand for said dial, means driving said indicating-hand, consisting of shaft G, wheels H, H', oppositely and separately operative on shaft G, shaft I, oppositely-acting wheels J, J' for shaft I, opposite pawls K, K' operated by the vehicle-wheel and oppositely and separately operative on their wheels J, J'.

4. In apparatus for indicating speed of vehicles the combination of a clock having suitable hour, minute and seconds hands, a speed-dial graduated to indicate speed in miles per hour or other given time, an indicating-hand for said dial, a shaft therefor passing through the arbors of the clock-hands, means operated by movement of a wheel of the vehicle driving said indicating-hand, said means moving the indicating-hand in one minute or other small period of time over as many divisions of the speed-dial as the vehicle is moving miles per hour, whereby by watching the indicating-hand for a minute the speed per hour can be determined.

5. In apparatus for indicating speed of vehicles the combination of a clock having suitable hour, minute and seconds hands, a speed-dial graduated to indicate speed in miles per hour or other given time, an indicating-hand for said dial, means operated by movement of a wheel of the vehicle driving said indicating-hand, a graduated recording-surface moved by the clock one space per hour, a recording-pencil, a spindle I' driven by the clock one revolution per hour, and a crank Q thereon and operating said pencil.

In witness whereof I have hereunto set my hand in presence of two witnesses.

GEORGE ROBERTSON HISLOP.

Witnesses:
WALLACE FAIRWEATHER,
JNO. ARMSTRONG, Junr.